July 14, 1970   G. W. KAMMAN ET AL   3,520,557
FIFTH WHEEL COUPLER WITH ROTARY DAMPING
Filed Oct. 26, 1967   2 Sheets-Sheet 1

INVENTORS
GORDON W. KAMMAN
PAUL E. GIES

BY *[signature]* ATTORNEYS

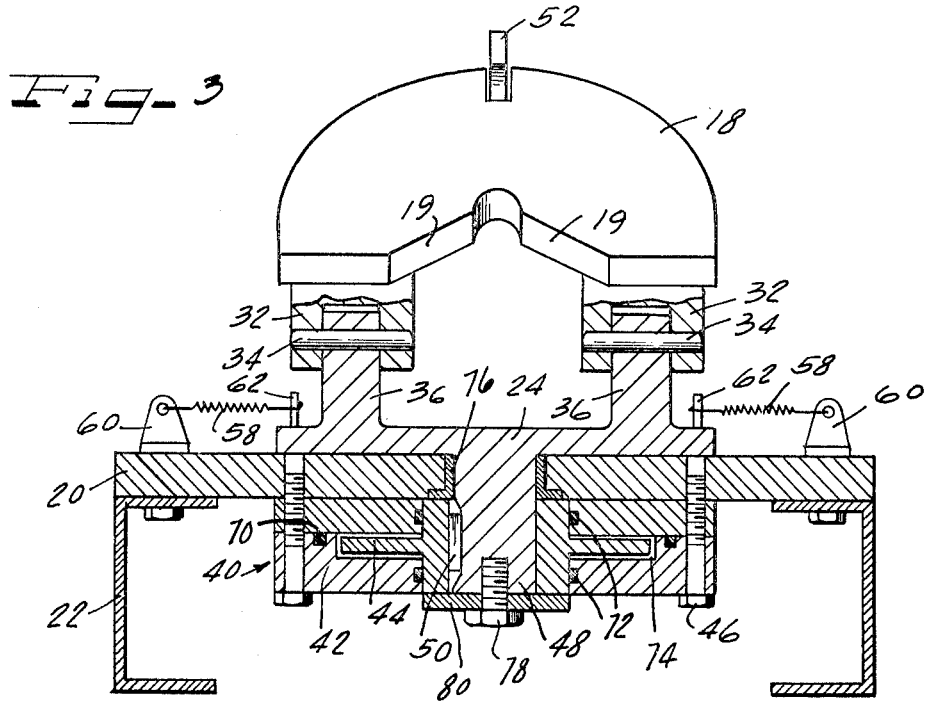
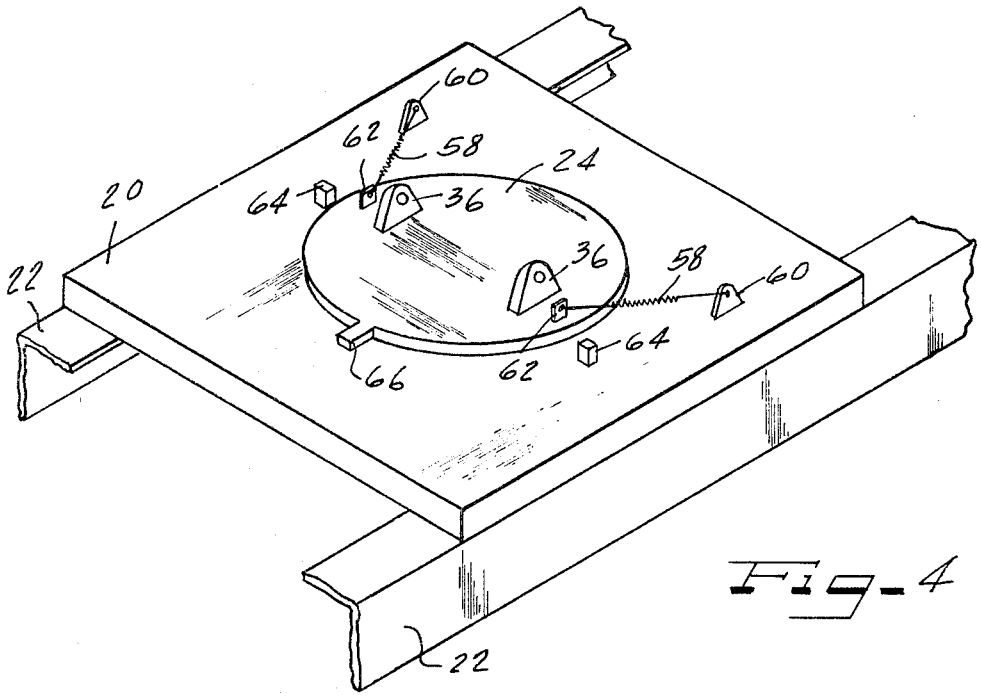

United States Patent Office 3,520,557
Patented July 14, 1970

3,520,557
FIFTH WHEEL COUPLER WITH ROTARY DAMPING
Gordon W. Kamman, Buffalo, and Paul E. Gies, Amherst, N.Y., assignors to Houdaille Industries, Inc., Buffalo, N.Y., a corporation of Michigan
Filed Oct. 26, 1967, Ser. No. 685,722
Int. Cl. B62d 53/08
U.S. Cl. 280—432                                16 Claims

ABSTRACT OF THE DISCLOSURE

A vehicle control apparatus for controlling the relative pivotal movement between a coupled trailer and tractor, comprising a mounting plate attached to the tractor frame, a viscous damper carried thereby, a rotating plate having a rigidly attached downward protruding shaft attached to the rotatable member of the viscous damper, a fifth wheel plate adapted to receive a trailer king pin, and a pinned hinge axis connecting the fifth wheel plate and the rotating plate, whereby the fifth wheel plate turns with the trailer and is damped by the viscous damper.

FIELD OF THE INVENTION

This invention pertains to improvements in fifth wheel assemblies and refers particularly to a fifth wheel coupler having a rotary viscous damper.

PRIOR ART

In the usual trailer truck arrangement a trailer unit is coupled to a tractor which provides motive power for drawing the trailer, and the trailer is coupled by means of a fifth wheel coupling unit which provides a point about which the coupled units may pivot. Normally in a trailer or semi-trailer unit, wheels are located only under the trailing end of the unit, and the front end of the unit is supported by the coupling device attached to the tractor. The tractor includes a steering mechanism for turning its front wheels, and these turning movements cause the trailer to pivot about the coupling point and to follow the path described by the steering movements of the tractor.

Uncontrolled or extreme pivotal movements of the trailer as related to the tractor may result in a jackknifing of the two units. Jackknifing can be described as a condition when the trailer swings into an extreme position about the coupling point and where the trailing end of the trailer approaches the front of the tractor. Such a condition may arise under adverse driving conditions such as where a highway is slippery and the inertia of the trailer carries it into an uncontrollable swing about the tractor.

Devices have been constructed in the prior art which attempt to control and prevent jackknifing conditions, but the prior devices have not been satisfactory in providing a corrective action to such uncontrolled pivotable movements under all driving conditions. In the usual prior art control device, a special effort is required on the part of the driver to actuate the device, or the device is so designed that it controls movements under certain conditions but not under other driving conditions which may arise. Furthermore, the prior attempts to control pivotal movements of a trailer have usually been limited to some type of locking or braking means which merely locks the trailer into a given position and prevents any further extreme movements.

Thus, it is known to use a fifth wheel coupler with damping provided by hydraulic, spring, and other mechanical locking devices.

The use of viscous dampers is also known in combinations requiring shock absorbing and smoothing of relative motion between mechanical members.

SUMMARY

A vehicle control apparatus for controlling the relative pivotal movement between a coupled trailer and tractor, comprising a viscous damper, a fifth wheel plate adapted to receive a trailer king pin, and a pinned hinge axis connecting the fifth wheel plate to the viscous damper, whereby the fifth wheel plate is damped by the viscous damper.

An important object of the present invention is to provide a fifth wheel coupler with rotary viscous damping mounted on the tractor to minimize the number of damping units required.

An object of the present invention is to provide a fifth wheel coupler having a rotary viscous damper to control pivotal movements of the trailer relative to a drawing vehicle such as a tractor.

Another object of the present invention is to provide a fifth wheel coupler which is readily accessible for insection, maintenance and replacement.

Yet a further object of the present invention is to provide a fifth wheel coupler with rotary viscous damping which automatically acts to prevent jackknifing and other undesirable movements of a trailer relative to a tractor.

Still another object of the present invention is to provide a fifth wheel coupler with rotary viscous damping which is simple, sturdy, reliable and efficient.

Still a further object of the present invention is to provide a fifth wheel coupler with rotary viscous damping which is adapted for use with the various type of trailers or semi-trailers now in use.

Many other advantages, features and additional objects of the present invention will become manifest to those versed in the art on making reference to the detailed description and the accompanying sheets of drawings in which a preferred structural embodiment incorporating the principles of the present invention is shown by way of illustrative example.

ON THE DRAWINGS

FIG. 3 is a sectional view taken along the line III—III of FIG. 2; and

FIG. 4 is a fragmentary perspective view of the coupler installed on a tractor with the fifth wheel plate removed to more clearly illustrate certain details.

AS SHOWN ON THE DRAWINGS

Figure 1:
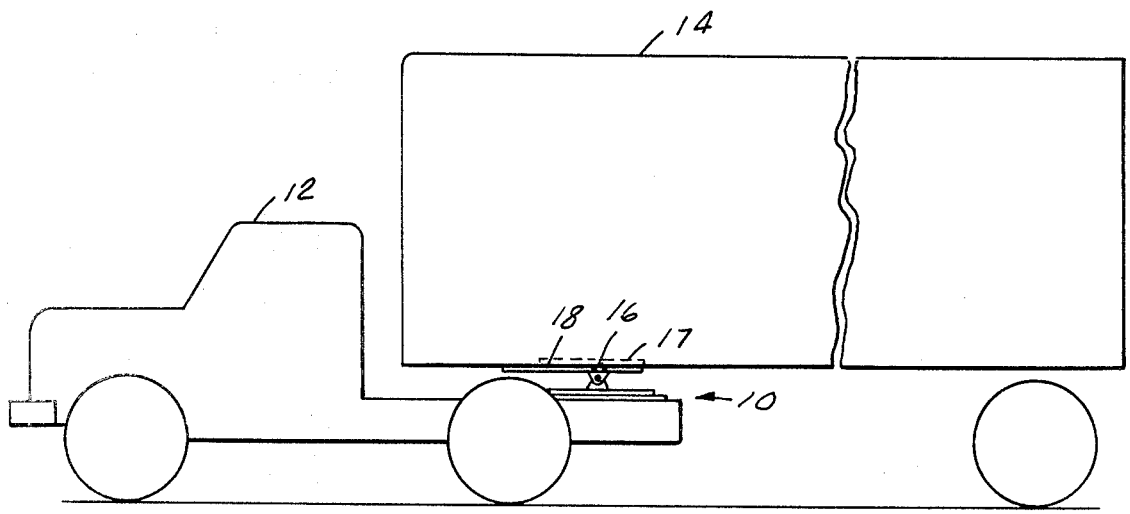
FIG. 1 is a side elevational view of the tractor and trailer showing the units when coupled and the fifth wheel coupler of the invention.

The principles of this invention are particularly useful when embodied in a fifth wheel coupler with rotary damping as illustrated in FIGS. 1 to 4, generally indicated by the numeral 10.

The fifth wheel coupler 10 of the present invention is normally used in a conventional trailer-truck vehicle where the forward end of the trailer, or semi-trailer, is supported by and coupled to the trailing end of the tractor. The truck or tractor unit is indicated generally by 12 and the trailer unit is shown at 14. The two units are coupled together by the fifth wheel coupler 10 which is mounted on the rear end of the tractor 12. The fifth wheel coupler 10 is adapted to receive a king pin 16 extending downwardly from a trailer wear plate 17 into a fifth wheel plate 18 having a V-shaped slot 19.

Suitable locking devices (not shown) are provided to hold the king pin 16 into the coupler 10, and when the trailer 14 is attached to the tractor 12, it can be seen that the trailer 14 may pivot in a horizontal plane about the pivot point defined by the king pin 16. Such an attachment of a trailer to a tractor is entirely conventional and is designed to permit a trailer to move pivotally in relation to the truck when the truck is being steered around curves on a highway.

The fifth wheel plate 18 is disposed above a mounting plate 20 which is attached to the tractor frame 22. The mounting plate 20 supports a rotating plate 24.

The fifth wheel plate 18 is connected to the rotating plate 24 through a pinned hinge axis 30 formed by a pair of hinged units each having a clevis 32 projecting from the fifth wheel plate 18, a pin 34, and a rotating plate linking member 36.

Beneath the mounting plate 20 is a rotary viscous damper generally indicated at 40 comprising a stationary member 42, a rotating member 44 and joined to the mounting plate by bolts 46 or the like, FIG. 3.

The rotating plate 24 has formed integrally therewith a downward protruding shaft 48 attached to the rotating member 44 by a key 50. Rotary movement of the shaft 48 is bossed by the rotating plate 24.

The fifth wheel plate 18, which engages the trailer king pin 16 has an additional locking feature such as a pin or blade 52 which is loaded by a spring 54 for vertical movement such as to engage the wear plate 17 of the trailer. In the uncoupled position, the relative position of the rotating plate 24 with respect to the mounting plate 20 is controlled by a pair of centering springs 58 secured to a pair of mounting plate posts 60 and a corresponding pair of rotating plate posts 62.

The rotary motion of the rotating plate 24 is limited by a pair of mounting plate stops 64 which cooperate with a projection 66 on the rotating plate 24.

The viscous damper 40 includes a static sealing ring 70 and a pair of vertically disposed dynamic sealing rings 72, FIG. 3. The rings prevent leakage of the viscous fluid from a circular chamber 74 formed between the stationary member 42 and rotating member 44. The shaft 48 rotates in an anti-friction bearing 76 formed in the mounting plate 20. At the base of the shaft 48 is a cover member formed by a threaded bolt 78 and a washer 80 which extends to the edge of the portion of the rotating member 44 which is exposed at the bottom of the viscous damper 40.

The viscous medium in the chamber 74 is, for example, a silicone fluid of a suitable centistoke viscosity rating as measured in a Saybolt viscosimeter such as has been used with excellent results in viscous dampers. The silicone fluid is operable with substantial uniformity throughout an extreme range of temperature conditions and is therefore especially valuable for couplers. A fill of this fluid is enclosed within the chamber 74, and fills all of the spaces between the operating disk of rotating member 44. The spacing between the opposing working surfaces of the disk and between the working surface of the stationary member 42 is greater than a mere lubricating film but is much closer than will result in a mere fluid frictional drag relationship between the disks and the viscous fluid, being so calculated that a shear film of the viscous fluid exists between opposing working surfaces. The working surface spacing is properly correlated to the viscosity of the fluid to afford a linear velocity gradient, as distinguished from a non-linear velocity gradient. That is, the laminar layers of fluid between the opposing working surfaces are, due to the relative closeness of the spacing between the surfaces, in a condition of shear rather than in a fluid drag relationship.

Figure 2:
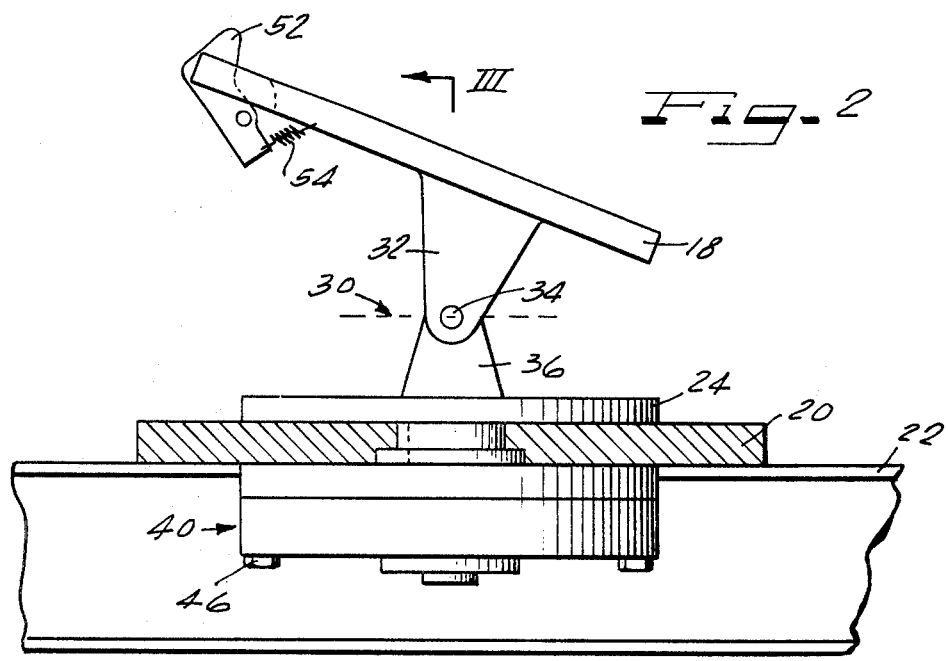
FIG. 2 is an enlarged side plan view of the coupler.

The fifth wheel plate 18 is connected to the rotating plate 24 through the pinned hinge axis 30, FIG. 2, which has a high resistance to movements about the longitudinal axis between the tractor 12 and the trailer 14. The rotating plate 24 transmits the normal loads due to trailer weight to the tractor frame 22 through the lubricated interface between the rotating plate 24 and the mounting plate 20. Horizontal loads of the king pin 16 are transmitted to the tractor frame 22 through the central bearing 76 from the downward protruding shaft 48 on the mounting plate 24.

The rotary viscous damper 40 provides anti-jackknifing as the tilt axis 30 of the fifth wheel 10 turns with the trailer and therefore will not allow the trailer 14 to tip sideways. The fifth wheel plate 18 has the additional locking feature of the spring loaded latch blade 52 which prevents relative rotary motion between the fifth wheel plate 18 and the wear plate 17 of the tractor. The blade 52 engages an aperture (not shown) in the wear plate 17 when the trailer is coupled to the tractor.

The rotary viscous damper 40 is mounted on the tractor and thereby minimizes the number of damping units required for each tractor-trailer combination. Normally, there is provided one tractor for four trailers. The rotary viscous damper 40 is more readily accessible for inspection, maintenance and replacements due to its placement on the mounting plate by means of bolts 46.

Stability of the tractor-trailer unit is achieved, particularly when the axis of the tractor and the trailer are at 90° as in turning or docking, as the tilt axis of the fifth wheel 18 turns with the trailer and therefore will not allow the trailer 14 to tip sideways.

In operation, the trailer 14 is joined to the tractor 12 by having the tractor back into the trailer. Coupling is assisted by the centering springs 58 which insure that the V-slot 19 of the fifth wheel plate 18 will be properly oriented to receive the king pin 16. When the king pin 16 has been received in the V-slot 19, appropriate locking means (not shown) are used to secure the king pin 16 to the fifth wheel plate 18. When the tractor 12 is moving in a straight line, slight movements between the trailer 14 and the tractor 12 actually take place due to road conditions, tolerances allowed between the tractor and trailer and the fifth wheel coupler 10. These slight movements tend to prevent normal tracking of the trailer 14 behind the truck 12, however, as the fifth wheel plate 18 is damped by the rotary viscous damper 40 there is prevented undue oscillatory movements of the trailer 14 relative to the tractor 12.

When it is desired to turn the tractor 12 along a curve or in docking, the driver turns the steering mechanism in the usual fashion and the tilt axis 30 of the fifth wheel 10 turns with the trailer. The fifth wheel plate 18 is locked to the trailer wear plate 17 by means of the spring loaded blade 52 and relative rotary motion therebetween is precluded. Relative motion between the trailer 14 and the tractor 12 are further limited by the stops 64, 66 on the mounting plate and rotating plate which limit the range of movement of the rotating plate 24. It can be seen that under hazardous road conditions, the rotary viscous damper 40 acts to prevent the initiation of a jackknifing movement by smoothing any extreme or sudden clockwise or counterclockwise pivoting of the trailer, due to the damping action of the rotary viscous damper 40. In this respect, in straightline driving down a long grade where braking actions of the vehicle may ordinarily tend to establish a whipping or fishtailing of the trailer relative to the truck, the rotary viscous damper 40 acts to maintain the trailer in a tracking position with respect to the tractor.

The invention as just described is easily manufactured by incorporating a viscous damper as taught by the invention in a conventional fifth wheel coupler plate. The assembled unit is rugged in construction and reliable in all of its actions. The use of the rotary viscous damper 40 provides a smoother control of the trailer 14 under a wider range of driving conditions than with prior control devices.

Although minor modifications might be suggested by those versed in the art, it should be understood that we wish to embody within the scope of the patent warranted

We claim:

1. A vehicle control apparatus for controlling relative pivotal movement between a trailer and a tractor to which the trailer is coupled, comprising:
    (a) viscous damper means having a stationary member and a rotatable member;
    (b) a mounting plate attached to the tractor frame;
    (c) a rotating plate having a rigidly attached downward protruding shaft, and said rotatable member of said viscous means attached thereto;
    (d) a fifth wheel plate adapted to receive a trailer king pin; and
    (e) pinned hinge axis means connecting said fifth wheel plate and said rotating plate, whereby the tilt axis of the fifth wheel plate turns with the trailer and thereby prevents jackknifing and damps the rotary motion of said fifth wheel plate.

2. A vehicle control apparatus according to claim 1, including centering spring means connected to and between said rotating plate and said mounting plate to orient said fifth wheel plate when uncoupled for subsequent couplings.

3. A vehicle control apparatus according to claim 1, including a pivoted latch member mounted on said fifth wheel plate to engage with a trailer wear plate to prevent rotary motion between these two plates.

4. A vehicle control apparatus according to claim 1, said damper member having a hub within which said shaft is engaged, and means keying said hub and said shaft co-rotatably.

5. A fifth wheel assembly for a tractor and a trailer comprising:
    (a) king pin means mounted on the trailer;
    (b) fifth wheel plate means mounted on the tractor, said plate means having a king pin receiving slot; and
    (c) viscous damper means secured in operative relationship to said fifth wheel plate means, whereby the motion of said king pin means and said fifth wheel plate means is damped.

6. A fifth wheel assembly as recited in claim 5 wherein said viscous damper means is mounted beneath said fifth wheel plate means.

7. In combination with a tractor and a trailer in which the trailer has a kingpin and a wear plate supporting said kingpin and the tractor has a fifth wheel plate having a kingpin receiving slot:
    mounting means on the tractor;
    a rotatable plate mounted on said mounting means;
    a viscous damper secured beneath said mounting means in operative relation to said rotatable plate;
    means operatively connecting said rotatable plate to said damper;
    means connecting said fifth wheel plate and said rotatable plate whereby the rotary motion of said fifth wheel plate is damped; and
    centering springs attached to said rotatable plate and to said mounting means.

8. In combination with a tractor and a trailer in which the trailer has a kingpin and a wear plate supporting said kingpin and the tractor has a fifth wheel plate having a kingpin receiving slot:
    mounting means on the tractor;
    a rotatable plate mounted on said mounting means;
    viscous damper means secured beneath said mounting means in operative relation to said rotatable plate;
    means operatively connecting said rotatable plate to said damper means;
    means connecting said fifth wheel plate and said rotatable plate whereby the rotary motion of said fifth wheel plate is damped; and
    a latch blade mounted on said fifth wheel plate and normally biased to engage in a slot in said wear plate to prevent relative rotary movement of said fifth wheel plate and said wear plate.

9. A fifth wheel coupler assembly for a tractor and a trailer and in which the tractor has a frame, comprising:
    a fifth wheel plate having a kingpin receiving slot;
    a mounting plate secured on the tractor frame and having a transversely centered hole provided with a bearing;
    a rotatable plate having a co-rotatable central downwardly extending shaft rotatably engaged in said bearing and projecting below said mounting plate;
    hinge means connecting said fifth wheel plate and said rotatable plate; and
    a viscous damper attached to the underside of said mounting plate about said hole and including a rotatable damper member attached to said shaft, whereby normal loads are transmitted to the tractor frame through the lubricated interface between said rotating and said mounting plates, and horizontal loads of said kingpin are transmitted to the frame through said central bearing.

10. A fifth wheel assembly for a tractor according to claim 9, including centering spring means attached to said rotatable plate and to said mounting plate to orient said fifth wheel plate when uncoupled for subsequent couplings.

11. A fifth wheel assembly for a tractor according to claim 9, including a latching member carried by said fifth wheel plate and engageable lockingly with a part of the trailer to prevent rotary motion between the fifth wheel plate and the trailer.

12. A fifth wheel assembly according to claim 9, said damper member having a hub within which said shaft is engaged, and means keying said hub and said shaft co-rotatably.

13. A tractor-mounted fifth wheel coupler and viscous damper comprising, in combination:
    a mounting plate adapted to be mounted rigidly on the tractor and having a hole therethrough provided with a bearing;
    a member having a rigid depending shaft extending through said bearing and projecting downwardly therebeyond whereby said member is rotatably supported on said mounting plate;
    a fifth wheel plate mounted co-rotatively on said member and adapted to receive a kingpin of a trailer to be coupled with a tractor;
    an annular viscous damper housing secured fixedly under said mounting plate concentrically about said hole and providing an annular working chamber extending radially from said hole;
    an annular damper member rotatably located in said working chamber and having working surfaces in confronting relation to working surfaces of the housing in shear film spaced relation having regard to a viscous damping fluid in said chamber;
    a co-rotative hub on said damper member engaged about said shaft; and
    means securing said shaft and said hub co-rotatively so that rotary movements of said member and said fifth wheel plate are damped by resistance to shear of the damping fluid in said chamber.

14. A combination according to claim 13, including a pair of centering springs secured to respectively opposite sides of said member and to said mounting plate and acting to maintain said member and said fifth wheel plate in a predetermined normal coupling orientation.

15. A combination according to claim 13, said member having a radially extending stop lug, and said mounting plate having a pair of spaced stop lugs rigid thereon and adapted to be engaged by said stop lug on the member at opposite ends of a range of rotary movement of said member relative to said mounting plate.

16. A combination according to claim 13, including a pair of centering springs secured to respectively opposite sides of said member and to said mounting plate and acting to maintain said member and said fifth wheel plate in a predetermined normal coupling orientation, said member having a radially extending stop lug, and said mounting plate having a pair of spaced stop lugs rigid thereon and adapted to be engaged by said stop lug on the member at opposite ends of a range of rotary movement of said member relative to said mounting plate.

References Cited

UNITED STATES PATENTS

| | | | |
|---|---|---|---|
| 2,170,898 | 8/1939 | Humphrey | 280—432 |
| 2,188,727 | 1/1940 | Soulis | 280—432 |
| 2,661,917 | 12/1953 | O'Connor. | |
| 3,037,792 | 6/1962 | Colpo | 280—438 X |
| 3,063,739 | 11/1962 | Davies | 280—438 |
| 3,328,051 | 6/1967 | Hope et al. | 280—432 |
| 3,420,548 | 1/1969 | Wakeman | 280—432 |
| 3,439,936 | 4/1969 | Hines | 280—432 |

FOREIGN PATENTS

| | | |
|---|---|---|
| 205,442 | 9/1956 | Australia. |
| 1,087,115 | 11/1953 | France. |

LEO FRIAGLIA, Primary Examiner

U.S. Cl. X.R.

188—90; 280—438, 446